(12) United States Patent
Katou et al.

(10) Patent No.: US 10,424,785 B2
(45) Date of Patent: Sep. 24, 2019

(54) NEGATIVE ELECTRODE MATERIAL INCLUDING COMPOSITE PARTICLES, AND METHOD FOR PRODUCING THE SAME

(71) Applicant: Panasonic Intellectual Property Management Co., Ltd., Osaka (JP)

(72) Inventors: Daisuke Katou, Kyoto (JP); Kenichi Hotehama, Osaka (JP); Junko Matsushita, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 273 days.

(21) Appl. No.: 15/623,399

(22) Filed: Jun. 15, 2017

(65) Prior Publication Data

US 2017/0373307 A1    Dec. 28, 2017

(30) Foreign Application Priority Data

Jun. 27, 2016  (JP) ................................. 2016-126297

(51) Int. Cl.
  *H01M 4/02* (2006.01)
  *H01M 4/36* (2006.01)
  (Continued)

(52) U.S. Cl.
  CPC ......... *H01M 4/366* (2013.01); *H01M 4/0471* (2013.01); *H01M 4/1393* (2013.01); *H01M 4/1395* (2013.01); *H01M 4/364* (2013.01); *H01M 4/386* (2013.01); *H01M 4/483* (2013.01); *H01M 4/587* (2013.01); *H01M 4/62* (2013.01); *H01M 4/623* (2013.01); *H01M 4/625* (2013.01); *H01M 10/0525* (2013.01);
  (Continued)

(58) Field of Classification Search
  CPC ....................................................... H01M 4/02
  See application file for complete search history.

(56) References Cited

U.S. PATENT DOCUMENTS

| 2009/0269669 | A1  | 10/2009 | Kim et al. |
| 2010/0075227 | A1* | 3/2010  | Morita ................. H01M 4/131 429/231.8 |
| 2016/0372753 | A1  | 12/2016 | Fukasawa et al. |

FOREIGN PATENT DOCUMENTS

| JP | 2008-186732 | 8/2008 |
| JP | 2010-073651 | 4/2010 |

(Continued)

*Primary Examiner* — Jacob B Marks
(74) *Attorney, Agent, or Firm* — McDermott Will & Emery LLP

(57) ABSTRACT

A negative electrode material for a non-aqueous electrolyte secondary battery includes a plurality of composite particles. Each of the plurality of composite particles includes an inorganic particle, one or more covering layers, each of which is in contact with a surface of the inorganic particle, and a carbonaceous material layer that covers the inorganic particle and has voids. The carbonaceous material layer includes a first region having a porosity of 4.3% or more and 10.0% or less, the first region being a region extending from the surface of the inorganic particle to the surface of an imaginary sphere that is centered at the center of the inorganic particle and has a radius of 3r, where r is a radius of the inorganic particle. Each of the voids is separated by one of the one or more covering layers from the surface of the inorganic particle.

9 Claims, 2 Drawing Sheets

(51) Int. Cl.
*H01M 4/04* (2006.01)
*H01M 4/38* (2006.01)
*H01M 4/48* (2010.01)
*H01M 4/587* (2010.01)
*H01M 4/62* (2006.01)
*H01M 10/0525* (2010.01)
*H01M 4/1393* (2010.01)
*H01M 4/1395* (2010.01)

(52) U.S. Cl.
CPC ...... *C01P 2004/17* (2013.01); *C01P 2004/40* (2013.01); *C01P 2004/80* (2013.01); *C01P 2006/42* (2013.01); *H01M 2004/027* (2013.01)

(56) References Cited

FOREIGN PATENT DOCUMENTS

| | | |
|---|---|---|
| JP | 2012-033317 | 2/2012 |
| JP | 2015-130287 | 7/2015 |
| WO | 2014/031929 | 2/2014 |
| WO | 2015/145521 | 10/2015 |

\* cited by examiner

NEGATIVE ELECTRODE MATERIAL INCLUDING COMPOSITE PARTICLES, AND METHOD FOR PRODUCING THE SAME

BACKGROUND

1. Technical Field

The present disclosure relates to a negative electrode material for a non-aqueous electrolyte secondary battery and a method for producing the negative electrode material.

2. Description of the Related Art

The recent rapid proliferation of personal digital assistants typified by smartphones and tablet PCs has increased the demand for non-aqueous electrolyte secondary batteries having small sizes and high energy densities used to drive such personal digital assistants.

For negative electrodes of non-aqueous electrolyte secondary batteries, graphite-based materials are typically used. The theoretical capacity of graphite-based materials is 372 mAh/g, and at present, there have been developed techniques for increasing the capacity of graphite-based materials almost to the limit. To further improve the energy density of non-aqueous electrolyte secondary batteries, it is necessary to develop novel electrode materials. Materials such as silicon and tin, which have next lowest electric potentials and electrochemical equivalents after those of lithium metal and carbon, have been attracting attention as novel negative electrode materials. Materials such as silicon and tin can be alloyed with lithium.

In particular, silicon can occlude 4.4 lithium atoms per silicon atom and theoretically has a capacity about 10 times those of graphite-based materials. Thus, attempts are being made to use silicon in negative electrode materials of non-aqueous electrolyte secondary batteries. For example, International Publication No. 2015/145521 and Japanese Patent No. 5406799 disclose negative electrode materials each including silicon and a carbonaceous material.

SUMMARY

In one general aspect, the techniques disclosed here feature a negative electrode material for a non-aqueous electrolyte secondary battery, the negative electrode material including a plurality of composite particles. Each of the plurality of composite particles includes an inorganic particle, one or more covering layers, each of which is in contact with a surface of the inorganic particle, and a carbonaceous material layer that covers the inorganic particle and has a plurality of voids. The carbonaceous material layer includes a first region having a porosity of 4.3% or more and 10.0% or less, the first region being a region extending from the surface of the inorganic particle to the surface of an imaginary sphere that is centered at the center of the inorganic particle and has a radius of 3r, where r is a radius of the inorganic particle. Each of the plurality of voids is separated by one of the one or more covering layers from the surface of the inorganic particle.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

A negative electrode material for a non-aqueous electrolyte secondary battery according to one aspect of the present disclosure includes a plurality of composite particles. Each of the plurality of composite particles includes an inorganic particle, a carbonaceous material layer, and one or more covering layers. The carbonaceous material layer has a plurality of voids and covers the inorganic particle. Each of the one or more covering layers is in contact with the surface of the inorganic particle and is exposed to at least one of the plurality of voids. The carbonaceous material layer has a first region having a porosity of 4.3% or more and 10.0% or less, the first region being a region extending from the surface of the inorganic particle to the surface of an imaginary sphere that is centered at the center of the inorganic particle and has a radius of 3r, wherein r is a radius of the inorganic particle.

In the present disclosure, the porosity of the first region means a volume fraction of the plurality of voids in the first region relative to the volume of the first region. The porosity of the second region is defined in the same way.

The inorganic particle according to the above aspect may be a primary particle made of an inorganic material or may be a secondary particle, which is an aggregate of primary particles.

The negative electrode material according to the above aspect may further include other composite particles in addition to "the plurality of composite particles" as defined above. In particular, when the negative electrode material has numbers of composite particles, it is only required that at least two of the numbers of composite particles satisfy the condition "the first region has a porosity of 4.3% or more and 10.0% or less", and the rest of the composite particles need not necessarily satisfy the condition. For example, there may be cases where two inorganic particles adjacent to each other exist in the negative electrode material. In such cases, a first region defined based on one of the two inorganic particles and another first region defined based on the other overlap each other, and as a result, the porosities of the two first regions may each exceed 10.0%. The negative electrode material according to the above aspect permits the inclusion of such composite particles.

In the above aspect, the porosity of the first region can be calculated, for example, by analyzing cross sections of the plurality of composite particles. In this case, the radius of the inorganic particle may be an equivalent circle radius of a cross section of the inorganic particle. The center of the inorganic particle may be a geometric center of the cross section of the inorganic particle.

An embodiment of the present disclosure will now be described with reference to the drawings. It should be understood that the following embodiment is not intended to limit the scope of the present disclosure.

Figure 1:
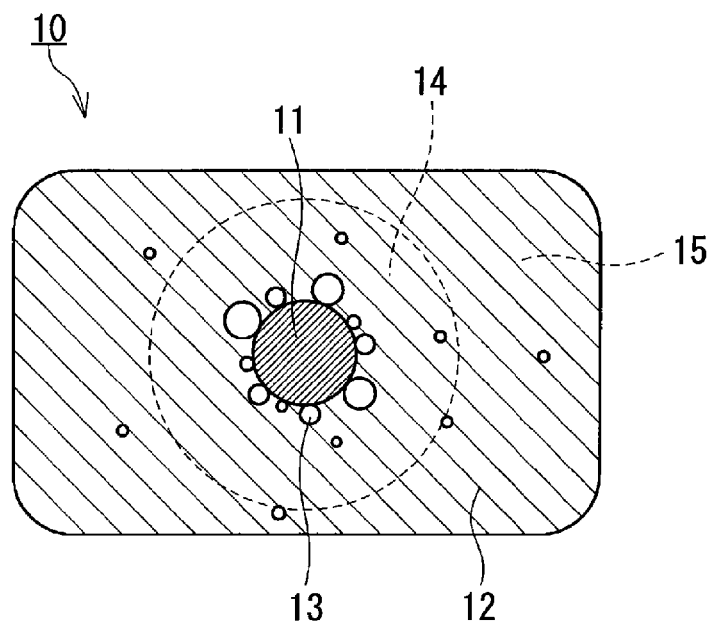
FIG. 1 is a schematic cross-sectional view of a specific composite material particle in a negative electrode material according to one embodiment of the present disclosure.

A negative electrode material for a non-aqueous electrolyte secondary battery according to this embodiment includes composite material particles. FIG. 1 is an enlarged cross-sectional view of part of a composite material particle 10. As shown in FIG. 1, the particle 10 in the composite material particles includes an inorganic particle (core material) 11 and a first covering layer 12 that covers the inorganic particle 11.

The first covering layer 12 is made of a carbonaceous material. The first covering layer 12 is an example of the "carbonaceous material layer" in the present disclosure.

The first covering layer 12 has a void 13. In FIG. 1, the first covering layer 12 has a plurality of voids 13. The shape of the void 13 is, for example, spherical. The void 13 is formed in great numbers in the vicinity of the surface of the inorganic particle 11. When the negative electrode material according to this embodiment is used in a non-aqueous electrolyte secondary battery, an electrolyte infiltrates into the void 13.

Figure 2:
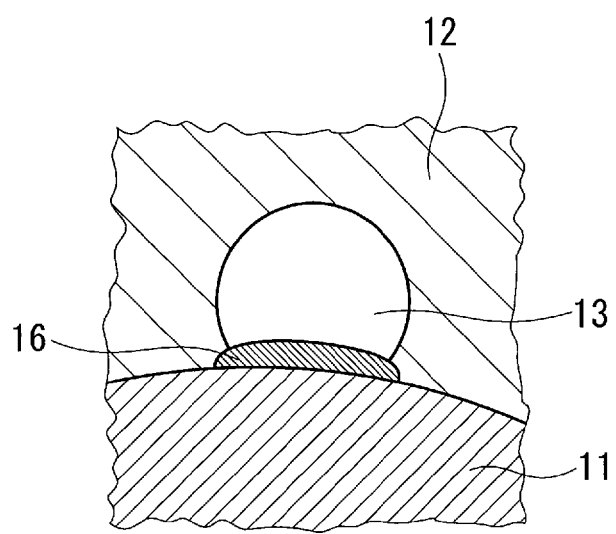
FIG. 2 is a partly enlarged view of FIG. 1 near an interface between an inorganic particle and a void.

As shown in FIG. 2, a second covering layer (shell material) 16 is disposed at an interface between at least one void 13 selected from the plurality of voids 13 and the inorganic particle 11. The second covering layer 16 is interposed between a specific void 13 and the surface of the inorganic particle 11. The specific void 13 is in contact with one surface of the second covering layer 16, and the inorganic particle 11 is in contact with the other surface of the second covering layer 16. The second covering layer 16 covers at least part of the surface of the inorganic particle 11. The second covering layer 16 prevents the inorganic particle 11 from coming into direct contact with an electrolyte that has infiltrated into the void 13. This can inhibit side reactions between the inorganic particle 11 and the electrolyte to provide a non-aqueous electrolyte secondary battery with an improved charge and discharge capacity retention. This can also provide a non-aqueous electrolyte secondary battery that undergoes less degradation in high-rate performance (high input-output characteristics). The particle 10 may be substantially formed of the inorganic particle 11, the first covering layer 12, and the second covering layer 16 alone.

The second covering layer 16 is an example of the "covering layer" in the present disclosure.

In FIG. 2, the surface of the inorganic particle 11 is not exposed to the void 13. In other words, the inner circumference of the void 13 is defined by the first covering layer 12 alone or by the first covering layer 12 and the second covering layer 16 alone. However, it is not essential that the void 13 be completely closed by the second covering layer 16. There may be cases where the inner circumference of the void 13 is defined by the first covering layer 12, the second covering layer 16, and the inorganic particle 11. In such cases, the above-described side reactions may be reduced due to the second covering layer 16.

In this embodiment, the first covering layer 12 includes a first portion 14 that is located over an area distant from the center of the inorganic particle 11 by a distance 1.0 time to less than 3.0 times the radius of the inorganic particle 11. The porosity of the first portion 14 is 4.3% by volume to 10.0% by volume based on the volume of the first portion 14. A porosity of the first portion 14 of 4.3% by volume or more sufficiently reduces the expansion of the negative electrode material that might otherwise be caused by the volume expansion of the inorganic particle 11. Such a porosity also reduces the possibility of cracking of the carbonaceous material in the first covering layer 12 that might otherwise be caused by the expansion of the inorganic particle 11, thus leading to less degradation of current collecting properties. A porosity of the first portion 14 of 10.0% by volume or less provides the negative electrode material with a high volume energy density and provides the carbonaceous material with strength sufficient to resist the expansion of the inorganic particle 11.

The first portion 14 is an example of the "first region" in the present disclosure. In FIG. 1, a dashed enclosure line defining the first portion 14 is an example of the "surface of an imaginary sphere" in the present disclosure.

The porosity of the first portion 14 may be 5.0% by volume to 10.0% by volume or 5.4% by volume to 9.0% by volume based on the volume of the first portion 14. When the porosity of the first portion 14 is 5.4% by volume to 9.0% by volume, a non-aqueous electrolyte secondary battery including the negative electrode material according to this embodiment shows a further improved capacity retention during charge and discharge cycles.

In this embodiment, when ten composite material particles 10 each including the first covering layer 12 having a thickness more than three times the radius of the inorganic particle 11 are randomly selected from the composite material particles in the negative electrode material, and the porosity of the first portion 14 is measured, the porosity of the first portion 14 of every particle 10 may be 4.3% by volume to 10.0% by volume based on the volume of the first portion 14. Alternatively, the average value of the porosity of the first portion 14 of the randomly selected ten composite material particles 10 in the negative electrode material may be 4.3% by volume to 10.0% by volume.

The first covering layer 12 includes a second portion 15 that is located over an area distant from the center of the inorganic particle 11 by a distance 3.0 times or more the radius of the inorganic particle 11. The second portion 15 defines the surface of the composite material particle 10. The porosity of the second portion 15 may be less than 5.0% by volume based on the volume of the second portion 15. A porosity of the second portion 15 of less than 5.0% by volume provides the negative electrode material with an improved volume energy density. The porosity of the second portion 15 is smaller than the porosity of the first portion 14.

The second portion 15 is an example of the "second region" in the present disclosure.

In this embodiment, when ten composite material particles 10 each including the first covering layer 12 having a thickness more than three times the radius of the inorganic particle 11 are randomly selected from the composite material particles in the negative electrode material, and the porosity of the second portion 15 is measured, the porosity of the second portion 15 of every particle 10 may be less than 5.0% by volume based on the volume of the second portion 15. Alternatively, the average value of the porosity of the second portion 15 of the randomly selected ten composite material particles 10 in the negative electrode material may be less than 5.0% by volume.

The radius of the inorganic particle 11, the porosity of the first portion 14, and the porosity of the second portion 15 can be determined as described below, for example. A cross section of the composite material particle 10 including the covering layer 12 having a thickness more than three times the radius of the inorganic particle 11 is exposed, and the cross section is micrographed with a scanning electron microscope (SEM). In the image obtained, $r_1$, which is a radius of a circle having an area equal to the cross-sectional area of the inorganic particle, is determined. The radius $r_1$ can be regarded as a radius of the inorganic particle. In the image obtained, $r_2$, which is a radius of a circle having an area equal to the cross-sectional area of the composite material particle, is determined. The radius $r_2$ can be regarded as a radius of the composite material particle. Z, which is a volume of a sphere having a radius equal to the radius $r_1$, $Z_1$, which is a volume of a sphere having a radius three times the radius $r_1$, and $Z_2$, which is a volume of a sphere having a radius equal to the radius $r_2$, are determined. $Z_1-Z$ can be regarded as a volume of the first portion, and $Z_2-Z_1$ can be regarded as a volume of the second portion. In the image obtained, the centroid of the inorganic particle is determined, and the centroid is regarded as the center of the inorganic particle. In the image obtained, a total cross-sectional area of voids in a region (the first portion or the second portion) that is located over an area distant from the center of the inorganic particle by a specific distance is determined. The total cross-sectional area of voids in the first portion is defined as an area $A_1$, and the total cross-sectional area of voids in the second portion is defined as an area $A_2$. $R_1$, which is a radius of a circle having an area equal to the area $A_1$, and $R_2$, which is a radius of a circle having an area equal to the area $A_2$, are determined. $V_1$, which is a volume of a sphere having a radius equal to the radius $R_1$, and $V_2$, which is a volume of a sphere having a radius equal to the radius $R_2$, are determined. A value obtained by dividing the volume $V_1$ by the volume of the first portion $(Z_1-Z)$ and multiplying the quotient by 100 can be regarded as a porosity of the first portion. A value obtained by dividing the volume $V_2$ by the volume of the second portion $(Z_2-Z_1)$ and multiplying the quotient by 100 can be regarded as a porosity of the second portion.

The cross section of the composite material in the negative electrode material can be exposed by any known method, for example, by using a broad ion beam (BIB).

The pore size, the shape, and the number of the voids 13 are not limited to any particular values as long as the first portion 14 has a porosity in the above range. For example, the average pore size of the voids 13 may be 100 nm or less, or may be 50 nm or less. A small average pore size of the voids 13 can inhibit the decrease in strength of the carbonaceous material. As used herein, the term "average pore size" is defined as a value obtained by measuring pore sizes of ten randomly selected pores (voids) by using an SEM image and averaging the measured values. The diameter of a circle having an area equal to the area of a pore in the SEM image can be regarded as a pore size.

The average particle size of the inorganic particles 11 in the composite material particles may be 3 μm or less. When the average particle size of the inorganic particles 11 is 3 μm or less, the average particle size of the composite material particles can be smaller than 15 μm, or smaller than 10 μm. This reduces the possibility that the lithium ion diffusion in the composite material is inhibited, leading to a non-aqueous electrolyte secondary battery that undergoes less degradation in rate performance. The average particle size of the inorganic particles 11 may be 100 nm or more, for example. As used herein, the term "average particle size" is defined as a value obtained by measuring particle sizes of ten randomly selected particles by using an SEM image and averaging the measured values. The diameter of a circle having an area equal to the area of a particle in the SEM image can be regarded as a particle size. The particle size of an inorganic particle in a specific composite material particle can be measured using the above-described method used to measure the radius of an inorganic particle. Specifically, a cross section of a specific composite material particle in the negative electrode material is exposed, and the cross section is micrographed with an SEM. In the image obtained, the diameter of a circle having an area equal to the cross-sectional area of the inorganic particle can be regarded as a particle size of the inorganic particle.

The inorganic material constituting the inorganic particle 11 can be a material capable of occluding and releasing lithium ions. Examples of such inorganic materials include silicon, tin, and zinc. That is to say, examples of the inorganic particle 11 include a silicon particle, a tin particle, and a zinc particle. Desirably, the inorganic particle 11 is a silicon particle.

The first covering layer 12 is formed of a carbonaceous material. The carbonaceous material may be any crystalline or amorphous carbon material capable of occluding lithium ions. Examples of such carbon materials include natural graphite (e.g., flake graphite), artificial graphite, soft carbon, and hard carbon.

The second covering layer 16 may be any material that does not react with an electrolyte and thus can prevent the inorganic particle 11 from coming into contact with the electrolyte. The second covering layer 16 may be formed, for example, of a composite oxide of magnesium or an alkaline earth metal (e.g. Ca, Sr, and Ba) and an inorganic material constituting the inorganic particle 11. This composite oxide is suitable for inhibiting side reactions between the inorganic particle 11 and the electrolyte. In addition, this composite oxide is easy to produce.

The thickness of the second covering layer 16 may be 3 nm or more. The thickness of the second covering layer 16 may be 10 nm or less. An appropriate thickness of the second covering layer 16 sufficiently inhibits side reactions between the inorganic particle 11 and the electrolyte.

In the specific composite material particle 10, the ratio of the weight of the inorganic particle 11 to the weight of the first covering layer 12 may be in the range of 1/99 to 30/70. Not less than 1% by weight of the inorganic particle 11 in the specific composite material particle 10 enables a sufficient amount of lithium to be alloyed with the inorganic particle 11, thus increasing the capacity of the negative electrode material. Not more than 30% by weight of the inorganic particle 11 in the specific composite material particle 10 makes it easy to produce the composite material particles.

The negative electrode material may contain the composite material particles in an amount of 1% by weight or more. The negative electrode material may be made substantially of the composite material particles.

The negative electrode material may optionally include a negative electrode conductive agent and a negative electrode binder in addition to the composite material described above. The negative electrode conductive agent may be a known material. The negative electrode binder may be a thermoplastic resin or a thermosetting resin. Examples of thermoplastic resins and thermosetting resins include polyethylene, polypropylene, polytetrafluoroethylene (PTFE), polyvinylidene fluoride (PVDF), styrene-butadiene rubber, tetrafluoroethylene-hexafluoroethylene copolymers, tetrafluoroethylene-hexafluoropropylene copolymers (FEP), tetrafluoroethylene-perfluoroalkyl vinyl ether copolymers (PFA), vinylidene fluoride-hexafluoropropylene copolymers, vinylidene fluoride-chlorotrifluoroethylene copolymers, ethylene-tetrafluoroethylene copolymers (ETFE), polychlorotrifluoroethylene (PCTFE), vinylidene fluoride-pentafluoropropylene copolymers, propylene-tetrafluoroethylene copolymers, ethylene-chlorotrifluoroethylene copolymers (ECTFE), vinylidene fluoride-hexafluoropropylene-tetrafluoroethylene copolymers, vinylidene fluoride-perfluoromethyl vinyl ether-tetrafluoroethylene copolymers, ethylene-acrylic acid copolymers, sodium-ion-crosslinked ethylene-acrylic acid copolymers, ethylene-methacrylic acid copolymers, sodium-ion-crosslinked ethylene-methacrylic acid copolymers, ethylene-methyl acrylate copolymers, sodium-ion-crosslinked ethylene-methyl acrylate copolymers, ethylene-methyl methacrylate copolymers, and sodium-ion-crosslinked ethylene-methyl methacrylate copolymers. The binder may be a single resin or a mixture of two or more resins selected from these thermoplastic resins and thermosetting resins. The negative electrode binder is desirably styrene-butadiene rubber, polyvinylidene fluoride, an ethylene-acrylic acid copolymer, a sodium-ion-crosslinked ethylene-acrylic acid copolymer, an ethylene-methacrylic acid copolymer, a sodium-ion-crosslinked ethylene-methacrylic acid copolymer, an ethylene-methyl acrylate copolymer, a sodium-ion-crosslinked ethylene-methyl acrylate copolymer, an ethylene-methyl methacrylate copolymer, or a sodium-ion-crosslinked ethylene-methyl methacrylate copolymer.

Next, a method for producing a negative electrode material for a non-aqueous electrolyte secondary battery according to this embodiment will be described.

The production method according to this embodiment includes a step (a) of mixing inorganic particles and a void former to form first composite particles (inorganic particle-void former composites) each including the inorganic particle and the void former, a step (b) of heat-treating a mixture of the first composite particles and a carbonaceous material precursor to form second composite particles (inorganic particle-void former-carbonaceous material composites), and a step (c) removing the void former from the second composite particles to form composite material particles. A specific particle in the particles includes an inorganic particle, a first covering layer that includes a plurality of voids and covers the inorganic particle, and a second covering layer that is disposed at an interface between the inorganic particle and at least one void selected from the plurality of voids and that covers the surface of the inorganic particle. The steps (a) to (c) are desirably carried out in the order shown in a flowchart of FIG. 3.

The inorganic particles for use in the step (a) may be any particles, and commercially available silicon particles, tin particles, and zinc particles can be used. The average particle size of the inorganic particles may be 3 μm or less. The average particle size of the inorganic particles may be 100 nm or more. Inorganic particles having such an average particle size can provide composite material particles having an average particle size of 10 μm or less.

The void former for use in the step (a) is a material that, under heat-treating conditions in the step (b), does not react with a carbonaceous material precursor or a carbonaceous material but can react with the inorganic material constituting the inorganic particles to form the second covering layer. In addition, the void former is a material that is readily removed in the step (c) (e.g., soluble in a solvent used in the step (c)). Examples of such materials include oxides of magnesium and oxides of alkaline earth metals. The void former has a particle shape, for example. In this case, the average particle size of the void former may be 100 nm or less. The average particle size of the void former may be 35 nm or more. A void former having such an average particle size can provide a specific composite material particle having an average void size of 100 nm or less.

In the step (a), the inorganic particles and the void former can be mixed by any known method, for example, by using a ball mill or a bead mill. Mixing the inorganic particles and the void former can provide first composite particles in which the void former physically or chemically adheres to the surface of the inorganic particles. The void former may be coordinated to the surface of the inorganic particles. The whole surface of the inorganic particles may be covered with a plurality of void formers, or only a portion of the surface of the inorganic particles may be covered with one or more void formers.

In the step (a), the molar mixing ratio of the inorganic particles to the void former may be 0.526/1 to 1.053/1.

In the production method according to this embodiment, the porosity of the first covering layer in a specific composite material particle to be obtained can be controlled by the average particle sizes of the inorganic particles and the void former for use in the step (a) and the molar mixing ratio of the inorganic particles to the void former.

The carbonaceous material precursor for use in the step (b) may be any substance that becomes a carbonaceous material under heat-treating conditions in the step (b). Examples of the carbonaceous material precursor include resin materials (polymeric materials) such as phenol resins and pitch, saccharides (monosaccharides and polysaccharides) such as sugar, other organic compounds, mixtures thereof, and mixtures of these substances and carbonaceous materials (e.g., natural graphite and artificial graphite).

As a result of mixing the carbonaceous material precursor with the first composite particles, the carbonaceous material precursor physically or chemically adheres to the surface of the first composite particles. The carbonaceous material precursor may be coordinated to the surface of the first composite particles. The whole surface of the first composite particles may be covered with the carbonaceous material precursor. The carbonaceous material precursor and the first composite particles can be mixed using the same method as used in the step (a). The mixing may be carried out by adding the carbonaceous material precursor to a dispersion of the first composite particles in an organic solvent such as tetrahydrofuran to prepare a mixed solution, and drying and solidifying the mixed solution.

In the step (b), the temperature of the heat treatment is, for example, 800° C. or higher. The heat treatment causes the inorganic material constituting the inorganic particles to react with the void former to form the second covering layer at interfaces between the inorganic particles and the void former. When an oxide of magnesium or an oxide of an alkaline earth metal is used as the void former, the second covering layer to be formed is a composite oxide of magnesium or the alkaline earth metal and the inorganic material constituting the inorganic particles. Furthermore, the heat treatment converts the carbonaceous material precursor into a carbonaceous material, whereby the second composite particles can be obtained. During the heat treatment, the void former retains its shape to some degree.

The temperature of the heat treatment may be 900° C. or higher. There is no upper limit to the temperature of the heat treatment. The temperature of the heat treatment may be, for example, 1,100° C. or lower. The time of the heat treatment can be appropriately set according to the extent of the reaction between the inorganic material constituting the inorganic particles and the void former and to the extent of the conversion of the carbonaceous material precursor into a carbonaceous material. The time of the heat treatment is, for example, 1 to 5 hours. The atmosphere during the heat treatment is, for example, an inert atmosphere.

In the step (c), the void former may be removed from the second composite particles by any method as long as the second covering layer is not removed. For example, the carbonaceous material, when having nano-sized pores (e.g. <50 nm), may be immersed in a solvent, and thereby the void former may be dissolved in the solvent through the nano-sized pores to remove the void former from the second composite particles. The solvent can be appropriately selected according to the void former and the second covering layer selected. Examples include water, aqueous acid solutions, and aqueous alkaline solutions. For example, when magnesium oxide is used as the void former, dilute hydrochloric acid can be used as the solvent. Specifically, the second composite particles are dispersed in the solvent to dissolve the void former in the solvent, and then the composite material particles are filtered, whereby the void former can be removed. Compared with the void former, the second covering layer formed by the production method according to this embodiment is less soluble.

After the step (c), the resulting composite material particles may be baked. The baking is carried out, for example, by treating the composite material particles in an argon atmosphere at 1,000° C. for 1 hour. Even when the carbonaceous material precursor remains in the composite material particles, the baking can turn the carbonaceous material precursor into a carbonaceous material.

The second composite particles obtained by the step (b) and the composite material particles obtained by the step (c) may be appropriately crushed by a known method. Such an operation can reduce the average particle size of the composite material particles.

The production method according to this embodiment can provide a negative electrode material in which side reactions between inorganic particles and an electrolyte are inhibited. The negative electrode material undergoes less inorganic particle-induced expansion and provides a non-aqueous electrolyte secondary battery with an improved charge and discharge capacity retention.

Alternatively, space in the vicinity of the surface of the inorganic particles covered by the first covering layer can be provided by mixing silicon particles having silicon oxide on their surface with a carbonaceous material and then removing the silicon oxide with an aqueous hydrofluoric acid solution. According to this method, however, the covering layer has a high porosity in the vicinity of the surface of the silicon particles, and the surface of the silicon particles is not sufficiently covered with the carbonaceous material. In such a composite material, the current collecting properties of silicon and the carbonaceous material are insufficient, and thus the composite material cannot provide a battery that exhibits sufficient rate performance.

Next, a non-aqueous electrolyte secondary battery according to this embodiment will be described.

Figure 3:
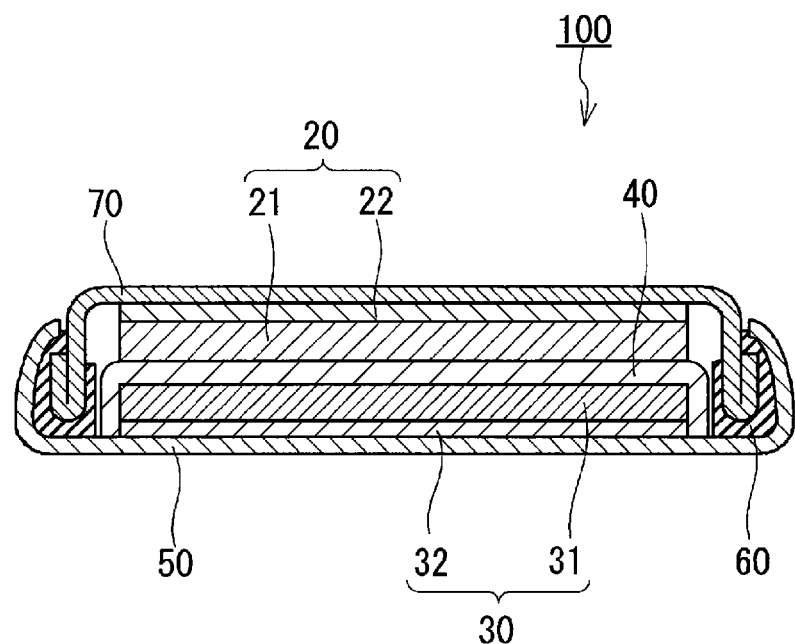
FIG. 3 is a cross-sectional view of a non-aqueous electrolyte secondary battery according to one embodiment of the present disclosure.
Figure 4:
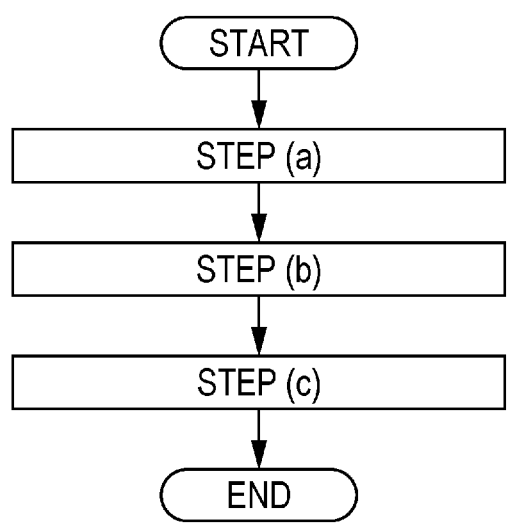
FIG. 4 is a flowchart illustrating a production method according to one embodiment of the present disclosure.

As shown in FIG. 3, a non-aqueous electrolyte secondary battery 100 includes a negative electrode 20, a positive electrode 30, and a separator 40. The separator 40 is disposed between the negative electrode 20 and the positive electrode 30. The negative electrode 20, the positive electrode 30, and the separator 40 are impregnated with a non-aqueous electrolyte. The non-aqueous electrolyte secondary battery 100 further includes a case 50, a gasket 60, and a sealing plate 70. The negative electrode 20, the positive electrode 30, and the separator 40 together form an electrode assembly. The electrode assembly is contained in the case 50. The case 50 is sealed with the gasket 60 and the sealing plate 70.

The negative electrode 20 includes a negative electrode active material layer 21 and a negative electrode current collector 22. The negative electrode active material layer 21 is disposed between the negative electrode current collector 22 and the separator 40. In place of the negative electrode current collector 22, the sealing plate 70 may be used as a negative electrode current collector.

The negative electrode active material layer 21 is formed of the negative electrode material according to this embodiment. The negative electrode current collector 22 may be any electronic conductor that undergoes no chemical change in an assembled secondary battery. The negative electrode current collector 22 may be made of, for example, stainless steel, nickel, copper, titanium, carbon, or a conductive resin. The negative electrode current collector 22 may also be made of, for example, copper or stainless steel that is surface-treated with carbon, nickel, or titanium. In particular, the negative electrode current collector 22 is desirably made of copper or a copper alloy. Furthermore, the materials listed above having an oxidized surface can also be used as the negative electrode current collector 22. The negative electrode current collector 22 is desirably surface-treated to have irregularities on its surface. The negative electrode current collector 22 may be in the form of a formed body such as a foil, a film, a sheet, a net, a punching, a mesh, a porous body, a foam, fibers, or a nonwoven fabric. The thickness of the negative electrode current collector 22 may be, but not necessarily, 1 to 500 µm, for example.

The positive electrode 30 includes a positive electrode active material layer 31 and a positive electrode current collector 32. The positive electrode active material layer 31 is disposed between the positive electrode current collector 32 and the separator 40. In place of the positive electrode current collector 32, the case 50 may be used as a positive electrode current collector. The positive electrode 30 and the negative electrode 20 are configured such that a surface of the positive electrode active material layer 31 facing the separator 40 faces a surface of the negative electrode active material layer 21 facing the separator 40.

The positive electrode active material layer 31 is formed from a known positive electrode material. The positive electrode material includes a positive electrode active material. The positive electrode active material may be, for example, metallic lithium or a lithium-containing compound. Examples of lithium-containing compounds include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$, wherein M includes at least one selected from Na, Mg, Sc, Y, Mn, Fe, Co, Ni, Cu, Zn, Al, Cr, Pb, Sb, and B, and x, y, and z satisfy $0<x\leq1.2$, $0\leq y\leq0.9$, and $2.0\leq z\leq2.3$, respectively. x is a value before the start of charging and discharging of the secondary battery, and this value increases or decreases as a result of charging and discharging. In addition to the above compounds, transition metal chalcogenides, lithium compounds of vanadium oxides, lithium compounds of niobium oxides, conjugated polymers including organic conductive substances, Chevrel-phase compounds, and other compounds can also be used as positive electrode active materials. The positive electrode material may include different positive electrode active materials. The average particle size of the one or more positive electrode active materials is desirably, but not necessarily, 1 to 30 µm.

The positive electrode material may optionally include a positive electrode conductive agent and a positive electrode binder. The positive electrode conductive agent may be any electron-conductive material that undergoes no chemical change at a charge and discharge potential of a positive electrode material used. Examples of electron-conductive materials include graphites such as natural graphite (e.g., flake graphite) and artificial graphite; carbon blacks such as acetylene black, Ketjen black, channel black, furnace black, lamp black, and thermal black; conductive fibers such as carbon fibers and metal fibers; powdered metals such as carbon fluoride, copper, nickel, aluminum, and silver; conductive whiskers such as zinc oxide and potassium titanate; conductive metal oxides such as titanium oxide; and organic conductive materials such as polyphenylene derivatives. The positive electrode conductive agent may be a single electron-conductive material or a mixture of two or more electron-conductive materials selected from these electron-conductive materials. The conductive agent is desirably artificial graphite, acetylene black, or nickel powder. The amount of conductive agent added may be, for example, but not necessarily, 1% to 50% by weight, or may be 1% to 30% by weight, based on the total amount of positive electrode material. When carbon or graphite is used as a conductive agent, the amount of conductive agent added is desirably 2% to 15% by weight based on the total amount of positive electrode material.

The positive electrode binder may be the same thermoplastic resin or thermosetting resin as listed as a negative electrode binder. The positive electrode binder is desirably PTFE or PVDF.

The positive electrode current collector 32 may be any electronic conductor that undergoes no chemical change at a charge and discharge potential of a positive electrode material used. The positive electrode current collector 32 may be made of, for example, stainless steel, aluminum, titanium, carbon, or a conductive resin. The positive electrode current collector 32 may also be made of, for example, aluminum or stainless steel that is surface-treated with carbon or titanium. In particular, the positive electrode current collector 32 is desirably made of aluminum or an aluminum alloy. Furthermore, the materials listed above having an oxidized surface can also be used as the positive electrode current collector 32. The positive electrode current collector 32 is desirably surface-treated to have irregularities on its surface. The positive electrode current collector 32 may be in the form of a formed body such as a foil, a film, a sheet, a net, a punching, a mesh, a porous body, a foam, fibers, or a nonwoven fabric. The thickness of the positive electrode current collector 32 may be, but not necessarily, 1 to 500 µm, for example.

The separator 40 for use is a thin insulating microporous film having high ion permeability and desired mechanical strength. The separator 40 may have a function to block its pores at or above a given temperature to improve resistance. From the viewpoint of resistance to organic solvents and hydrophobicity, the separator 40 may be in the form of a sheet, a nonwoven fabric, or a woven fabric made from glass fibers; a single polymer or a mixture of two or more polymers selected from olefin polymers such as polypropylene and polyethylene; or other materials. The pore size of the separator 40 is not limited to a particular size as long as the negative electrode material and the positive electrode material detached from the electrode current collectors (electrode sheets) cannot permeate the separator. The pore size is desirably 0.01 to 1.0 µm. The thickness of the separator 40 is desirably 10 to 300 µm. The porosity of the separator 40 can be appropriately selected depending on the permeability of electrons and ions, the type of material, and the film pressure. The porosity of the separator 40 is desirably 30% to 80%.

The non-aqueous electrolyte infiltrated into the negative electrode 20, the positive electrode 30, and the separator 40 includes a non-aqueous solvent, a lithium salt dissolved in the solvent, and an additive.

Examples of the non-aqueous solvent include cyclic carbonates such as ethylene carbonate (EC), fluoroethylene carbonate (FEC), propylene carbonate (PC), butylene carbonate (BC), vinylene carbonate (VC), and propylene carbonate derivatives; linear carbonates such as dimethyl carbonate (DMC), diethyl carbonate (DEC), ethyl methyl carbonate (EMC), and dipropyl carbonate (DPC); cyclic carboxylic acid esters such as γ-butyrolactone and γ-valerolactone; linear ethers such as 1,2-dimethoxyethane (DME), 1,2-diethoxyethane (DEE), ethoxymethoxyethane (EME), and diethyl ether; cyclic ethers such as tetrahydrofuran, 2-methyltetrahydrofuran, and tetrahydrofuran derivatives; and aprotic organic solvents such as dimethyl sulfoxide, 1,2-dioxolane, 1,3-dioxolane, dioxolane derivatives, formamide, acetamide, dimethylformamide, acetonitrile, propylnitrile, nitromethane, ethyl monoglyme, phosphoric acid triesters, trimethoxymethane, sulfolane, methylsulfolane, 1,3-dimethyl-2-imidazolidinone, 3-methyl-2-oxazolidinone, 1,3-propane sultone, anisole, and N-methylpyrrolidone (NMP). The non-aqueous solvent may be a single solvent or a mixture of two or more solvents selected from these solvents.

Examples of the lithium salt dissolved in the non-aqueous solvent include $LiClO_4$; $LiBF_4$; $LiPF_6$; $LiAlCl_4$; $LiSbF_6$; LiSCN; $LiCF_3SO_3$; $LiCF_3CO_2$; $Li(CF_3SO_2)_2$; $LiAsF_6$; $LiB_{10}Cl_{10}$; lithium lower aliphatic carboxylates; LiCl; LiBr; LiI; chloroborane lithium; borates such as lithium bis(1,2-benzenediolato(2-)—O,O')borate, lithium bis(2,3-naphthalenediolato(2-)—O,O')borate, lithium bis(2,2'-biphenyldiolato(2-)—O,O')borate, and lithium bis(5-fluoro-2-olato-1-benzenesulfonato-O,O')borate; and imide salts such as lithium bis(trifluoromethanesulfonyl)imide (($CF_3SO_2)_2NLi$) and lithium bis(pentafluoroethanesulfonyl)imide (($C_2F_5SO_2)_2NLi$). The lithium salt may be a single salt or a mixture of two or more salts selected from these salts.

The amount of non-aqueous electrolyte added to the non-aqueous electrolyte secondary battery 100 is not limited to a particular amount, and can be appropriately adjusted depending on the amount of positive electrode material, the amount of negative electrode material, and the size of the non-aqueous electrolyte secondary battery 100. The concentration of the lithium salt (supporting electrolyte) in the non-aqueous solvent may be, but not necessarily, 0.2 to 2.0 mol/L, or may be 0.5 to 1.5 mol/L.

The case 50 may be a known case. The gasket 60 may be a known gasket. The sealing plate 70 may be a known sealing plate.

The non-aqueous electrolyte secondary battery 100 may have a shape such as a button, a sheet, a laminate, a cylinder, a flat plate, or a prism as well as a coin shown in FIG. 2. The non-aqueous electrolyte secondary battery 100 may be a large battery for use in electric vehicles and in others.

The non-aqueous electrolyte secondary battery 100 can be manufactured by any known method without any modifications.

The non-aqueous electrolyte secondary battery according to this embodiment can be used, for example, in personal digital assistants, mobile electronic devices, small-size power storage devices for household use, motorcycles, electric vehicles, and hybrid electric vehicles.

Examples

The present disclosure will be specifically described with reference to examples. It should be noted that the following examples are not intended to limit the scope of the present disclosure.

Preparation of Negative Electrode Material

Sample 1

Silicon particles and magnesium oxide were mixed in an argon atmosphere. The average particle size of the silicon particles was 100 nm. The average particle size of the magnesium oxide was 35 nm. The mixing ratio of the silicon particles to the magnesium oxide (Si:MgO) was 1:1.9 by mole. The silicon particles and the magnesium oxide were mixed in a crusher for 1 hour to provide a mixed powder (i.e. first composite particles) containing Si and MgO. The crusher used was a high-energy ball mill (8000M available from SPEX).

Next, 1.3 g of the mixed powder was dispersed in 20 g of tetrahydrofuran to provide a dispersion. A carbon pitch, serving as a carbonaceous material precursor, in an amount of 2.3 g was added to the dispersion to prepare a mixed solution. The ratio of the weight of silicon (Si) to the weight of carbon (C) of the carbonaceous material precursor was 20/80. The mixed solution was dried and solidified in air at 50° C. to provide an inorganic particle-void former-carbonaceous material precursor composite. The composite was baked in an electric furnace. The baking was carried out in an argon atmosphere at 1,000° C. for 1 hour. The composite was then cooled to room temperature and crushed using a mortar to provide a Si/Mg—Si composite oxide/MgO/carbonaceous material composite (second composite particles). The carbonaceous material contained in the second composite particles was soft carbon.

The second composite particles were dispersed in 100 mL of a 2 N aqueous HCl solution, and the dispersion was stirred with a magnetic stirrer for 6 hours. The resulting mixture was then filtered to yield a solid. The solid was dried at 110° C. and then baked in an argon atmosphere at 1,000° C. for 1 hour. The baked solid was cooled to room temperature and then crushed using a mortar to provide a Si/Mg—Si composite oxide/carbonaceous material composite (composite material particles).

Polyvinylidene fluoride, serving as a binder, was added to the composite material particles to prepare a negative electrode material. The ratio of the weight of the composite material particles to the weight of the binder added was 9/1.

Sample 2

A negative electrode material was prepared in the same manner as in Sample 1 except that in preparing the first composite particles, silicon particles and magnesium oxide were mixed in a molar ratio of 1:0.95 (Si:MgO).

Sample 3

A negative electrode material was prepared in the same manner as in Sample 1 except that in preparing the first composite particles, silicon particles and magnesium oxide were mixed in a molar ratio of 1:0.475 (Si:MgO).

Sample 4

A negative electrode material was prepared in the same manner as in Sample 1 except that in preparing the first composite particles, silicon particles and magnesium oxide were mixed in a molar ratio of 1:3.8 (Si:MgO), and that the inorganic particle-void former-carbonaceous material precursor composite was heat-treated at 750° C.

Sample 5

A negative electrode material was prepared in the same manner as in Sample 1 except that in preparing the first composite particles, silicon particles and magnesium oxide were mixed in a molar ratio of 1:0.1 (Si:MgO), and that the operation of dispersing the second composite particles in an aqueous HCl solution was omitted.

Porosity and Average Pore Size

The porosity of first portions of the composite material particles in the negative electrode materials of Samples 1 to 5 and its average value were calculated according to the method described in the embodiment. Table 1 shows calculated minimum and maximum values of the porosity of the first portions. The porosity was measured using cross sections of ten composite material particles randomly selected from the composite material particles in each negative electrode material, the ten composite material particles each including a first covering layer having a thickness more than three times the radius of an inorganic particle. Also, the average value of the porosity of the first portions was calculated. Furthermore, the average void size was calculated according to the method described in the embodiment.

Analysis of Second Covering Layer

The composite material particles in the negative electrode materials of Samples 1 to 5 were subjected to X-ray absorption fine structure analysis to check the presence of the second covering layer. The X-ray absorption fine structure analysis was performed on ten composite material particles randomly selected from the composite material particles in each negative electrode material. From the analytical results, composite material particles showing a spectrum attributed to the Mg—Si composite oxide were determined to have the second covering layer, and composite material particles not showing such a spectrum were determined not to have the second covering layer. The X-ray absorption fine structure analysis was performed by a fluorescence method in the energy range of 1,250 to 1,400 eV using KTP (011) as an analyzing crystal. The results are shown in Table 1.

Preparation of Evaluation Cell

Next, using the negative electrode material of Sample 1, an evaluation cell of Sample 1 was prepared by the following method.

The negative electrode material was dispersed in an N-methylpyrrolidone (NMP) solvent to prepare a slurry. Using a coater, the slurry was applied to a Cu current collector, serving as a negative electrode current collector. The current collector (electrode plate) coated with the slurry was rolled with a rolling machine and punched out into a square of side 20 mm. To the electrode plate punched out, a current collector tab was welded to obtain a test electrode processed into the form of an electrode.

Using the test electrode and a counter electrode including lithium metal, a lithium secondary battery (evaluation cell) was fabricated. In fabricating the lithium secondary battery, the preparation of an electrolyte and the fabrication of the evaluation cell were carried out in an argon atmosphere glove box set to a dew point of −60° C. or less and an oxygen level of 1 ppm or less. The counter electrode used was a square lithium metal of side 20 mm with a nickel mesh attached by pressing. The separator used was a microporous polyethylene membrane. The electrolyte used was a 1 mol/L solution of lithium hexafluorophosphate ($LiPF_6$) in a solvent of ethylene carbonate (EC) and ethyl methyl carbonate (EMC) mixed in a volume ratio of 1:3.

The evaluation cell was fabricated by placing the test electrode and the counter electrode in an outer case such that the electrodes were oppositely disposed with the separator impregnated with the electrolyte interposed therebetween, and sealing the outer case with a gasket and a sealing plate.

Using the negative electrode materials of Samples 2 to 5, evaluation cells were prepared in the same manner as in Sample 1.

Evaluation of Capacity Retention

The evaluation cells of Samples 1 to 5 were each subjected to a charge-discharge test to evaluate their capacity retention.

The charge-discharge test was carried out by charging each evaluation cell to a charge cutoff potential of 0 V vs. Li/Li$^+$ at a constant current at a charging current density of 37.7 mA/g, followed by a rest for 20 minutes, and then discharging the evaluation cell to a discharge cutoff potential of 1.5 V vs. Li/Li$^+$ at a constant current at a discharge current density of 37.7 mA/g. This cycle of charge-discharge testing was performed for multiple times.

The discharge capacity of each evaluation cell was measured at each cycle, and the capacity retention (%) at the 10th cycle was calculated. The capacity retention (%) at the 10th cycle of the evaluation cells is shown in Table 1. The capacity retention at the 10th cycle can be calculated by the following equation.

Capacity retention (%) at 10th cycle=(discharge capacity at 10th cycle/discharge capacity at 1st cycle)×100

TABLE 1

|  | Minimum and Maximum Porosity of First Portion (vol %) | Average Porosity of First Portion (vol %) | Average Pore Size of Voids (nm) | Capacity Retention at 10th Cycle (%) | Second Covering Layer |
|---|---|---|---|---|---|
| Sample 1 | 5.4-9.0 | 7.9 | 39.1 | 82.3 | Present |
| Sample 2 | 4.3-6.7 | 5.2 | 40.6 | 81.1 | Present |
| Sample 3 | 1.6-3.0 | 2.4 | 44.4 | 29.7 | Present |
| Sample 4 | 7.4-14.2 | 10.9 | 62.3 | 77.7 | Absent |
| Sample 5 | 0.1-3.5 | 1.3 | 29.2 | 26.1 | Present |

The porosities of the first portions of the negative electrode materials of Samples 1 and 2 were higher than the porosities of the first portions of the negative electrode materials of Samples 3 and 5. The capacity retentions of the evaluation cells fabricated using the negative electrode materials of Samples 1 and 2 were higher than the capacity retentions of the evaluation cells fabricated using the negative electrode materials of Samples 3 and 5. This is probably due to the following reasons: in each of the negative electrode materials of Samples 1 and 2, the relatively high porosity of the first portion inhibited the volume expansion/shrinkage of silicon particles during the charging and discharging of the evaluation cell, and as a result, the separation of the negative electrode active material layer including the negative electrode material from the current collector or from others, and the decrease in conductivity between the composite materials were inhibited.

The capacity retentions of the evaluation cells fabricated using the negative electrode materials of Samples 1 and 2 were higher than the capacity retention of the evaluation cell fabricated using the negative electrode material of Sample 4, which included composite material particles not having the second covering layer. This is probably due to the following reason: in the composite material particles in the negative electrode materials of Samples 1 and 2, the presence of the second covering layer inhibited side reactions between silicon particles and an electrolyte.

Summary of Embodiment

A first aspect of the present disclosure provides a negative electrode material for a non-aqueous electrolyte secondary battery, the negative electrode material including composite material particles, wherein a specific particle in the particles includes an inorganic particle and a first covering layer that includes a plurality of voids and covers the inorganic particle; the first covering layer is formed of a carbonaceous material and includes a first portion that is located over an area distant from the center of the inorganic particle by a distance 1.0 time to less than 3.0 times the radius of the inorganic particle; the porosity of the first portion is 4.3% by volume to 10.0% by volume based on the volume of the first portion; and the specific particle further includes a second covering layer that is disposed at an interface between the inorganic particle and at least one void selected from the plurality of voids and that covers the surface of the inorganic particle.

According to the first aspect, the expansion of the composite material particles due to the inorganic particles can be inhibited. As a result, the expansion of the negative electrode material is inhibited. In addition, side reactions between the inorganic particle and an electrolyte are inhibited. The negative electrode material according to the first aspect can provide a non-aqueous electrolyte secondary battery with an improved charge and discharge capacity retention.

In a second aspect of the present disclosure, for example, the second covering layer of the negative electrode material for a non-aqueous electrolyte secondary battery according to the first aspect is formed of a composite oxide of magnesium or an alkaline earth metal and an inorganic material constituting the inorganic particle. According to the second aspect, side reactions between the inorganic particle and an electrolyte are further inhibited.

In a third aspect of the present disclosure, for example, the porosity of the negative electrode material for a non-aqueous electrolyte secondary battery according to the first or second aspect is 5.0% by volume to 10.0% by volume based on the volume of the first portion. According to the third aspect, a non-aqueous electrolyte secondary battery with a more improved charge and discharge capacity retention can be provided.

In a fourth aspect of the present disclosure, for example, the porosity of the negative electrode material for a non-aqueous electrolyte secondary battery according to the third aspect is 5.4% by volume to 9.0% by volume based on the volume of the first portion. According to the fourth aspect, a non-aqueous electrolyte secondary battery with a more improved charge and discharge capacity retention can be provided.

In a fifth aspect of the present disclosure, for example, the first covering layer of the negative electrode material for a non-aqueous electrolyte secondary battery according to any one of the first to fourth aspects includes a second portion that is located over an area distant from the center of the inorganic particle by a distance 3.0 times or more the radius of the inorganic particle, and the porosity of the second portion is less than 5.0% by volume based on the volume of the second portion. According to the fifth aspect, the negative electrode material has an improved volume energy density.

In a sixth aspect of the present disclosure, for example, the ratio of the weight of the inorganic particle to the weight of the first covering layer in the negative electrode material for a non-aqueous electrolyte secondary battery according to any one of the first to fifth aspects is in the range of 1/99 to 30/70. According to the sixth aspect, the negative electrode material has a higher capacity.

A seventh aspect of the present disclosure provides a non-aqueous electrolyte secondary battery including a negative electrode including the negative electrode material for a non-aqueous electrolyte secondary battery according to any one of the first to sixth aspects, a positive electrode, and a non-aqueous electrolyte.

According to the seventh aspect, a non-aqueous electrolyte secondary battery with an improved charge and discharge capacity retention can be provided.

An eighth aspect of the present disclosure provides a method for producing a negative electrode material for a non-aqueous electrolyte secondary battery, the method including mixing inorganic particles and a void former to form first composite particles each including the inorganic particle and the void former, heat-treating a mixture of the first composite particles and a carbonaceous material precursor to form second composite particles, and removing the void former from the second composite particles to form composite material particles, wherein a specific particle in the particles includes the inorganic particle, a first covering layer that includes a plurality of voids and covers the inorganic particle, and a second covering layer that is disposed at an interface between the inorganic particle and at least one void selected from the plurality of voids and that covers the surface of the inorganic particle.

According to the eighth aspect, a negative electrode material in which side reactions between inorganic particles and an electrolyte are inhibited can be provided. The negative electrode material undergoes less inorganic particle-induced expansion and provides a non-aqueous electrolyte secondary battery with an improved charge and discharge capacity retention.

In a ninth aspect of the present disclosure, for example, the mixture of the first composite particles and the carbonaceous material precursor is heat-treated at a temperature of 800° C. or higher in the method for producing a negative electrode material for a non-aqueous electrolyte secondary battery according to the eighth aspect. According to the ninth aspect, the formation of the second covering layer is facilitated.

The negative electrode material according to this embodiment can be used for non-aqueous electrolyte secondary batteries used in personal digital assistants, mobile electronic devices, small-size power storage devices for household use, motorcycles, electric vehicles, hybrid electric vehicles, and others.

What is claimed is:

1. A negative electrode material for a non-aqueous electrolyte secondary battery, the negative electrode material comprising a plurality of composite particles, wherein each of the plurality of composite particles includes:
    an inorganic particle;
    one or more covering layers, each of which is in contact with a surface of the inorganic particle; and
    a carbonaceous material layer that covers the inorganic particle and has a plurality of voids, and
    the carbonaceous material layer includes a first region having a porosity of 4.3% or more and 10.0% or less, the first region being a region extending from the surface of the inorganic particle to a surface of an imaginary sphere that is centered at a center of the inorganic particle and has a radius of 3r, where r is a radius of the inorganic particle, and
    each of the plurality of voids is separated by one of the one or more covering layers from the surface of the inorganic particle.

2. The negative electrode material according to claim 1, wherein:
    the radius of the inorganic particle is an equivalent circle radius of a cross section of the inorganic particle; and
    the center of the inorganic particle is a geometric center of the cross section of the inorganic particle.

3. The negative electrode material according to claim 1, wherein the one or more covering layers each contain a composite oxide of an element contained in the inorganic particle and at least one element of magnesium or an alkaline earth metal.

4. The negative electrode material according to claim 1, wherein the surface of the inorganic particle includes:
    a first portion that is in direct contact with the one or more covering layers; and
    a second portion that is in direct contact with the carbonaceous material layer.

5. The negative electrode material according to claim 1, wherein the porosity of the first region is 5.0% or more and 10.0% or less.

6. The negative electrode material according to claim 5, wherein the porosity of the first region is 5.4% or more and 9.0% or less.

7. The negative electrode material according to claim 1, wherein the carbonaceous material layer further includes a second region having a porosity of less than 5.0%, the second region being a region extending from the surface of the imaginary sphere to an outer surface of the carbonaceous material layer.

8. The negative electrode material according to claim 1, wherein a ratio of a weight of the inorganic particle to a weight of the carbonaceous material layer is 1/99 or more and 30/70 or less.

9. A non-aqueous electrolyte secondary battery comprising:
    a negative electrode containing the negative electrode material according to claim 1;
    a positive electrode; and
    a non-aqueous electrolyte.

* * * * *